(12) United States Patent
Maeda et al.

(10) Patent No.: US 7,272,484 B1
(45) Date of Patent: Sep. 18, 2007

(54) CONTROL APPARATUS FOR INTERNAL COMBUSTION ENGINE

(75) Inventors: Naohide Maeda, Tokyo (JP); Masahiko Fujita, Tokyo (JP); Masaya Inoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/592,195

(22) Filed: Nov. 3, 2006

(51) Int. Cl.
*B60K 41/02* (2006.01)
(52) U.S. Cl. ...................... 701/102; 180/65.2
(58) Field of Classification Search ............ 701/102, 701/110, 22; 180/65.2, 65.3; 477/5, 3
See application file for complete search history.

(56) References Cited

U.S. PATENT DOCUMENTS 5,644,200 A * 7/1997 Yang .................... 180/65.2
6,524,219 B2 * 2/2003 Mesiti et al. ............ 180/65.2

FOREIGN PATENT DOCUMENTS

FR 2 858 018 A1 * 1/2005
JP 2617936 B2 3/1997

* cited by examiner

*Primary Examiner*—Hieu T. Vo
(74) *Attorney, Agent, or Firm*—Sughrue Mion, PLLC

(57) ABSTRACT

A control apparatus for an internal combustion engine can effectively suppress the rotational fluctuation of the engine by properly controlling the operating state of a rotating electrical machine without applying an excessive load to a power supply system connected to the rotating electrical machine. The rotating electrical machine is used for both electric operation and electric power generation, and is connected to the engine. A control circuit controls at least one of a field current and an armature current of the rotating electrical machine. A power supply system is connected to the rotating electrical machine. A rotational fluctuation suppression section (ECU) suppresses the rotational fluctuation of the engine by controlling an amount of electric power and generated torque of the rotating electrical machine in accordance with an electric power load of the vehicle, an amount of electric power of the power supply system, and the rotational speed of the rotating electrical machine.

8 Claims, 9 Drawing Sheets

FIG. 5

| AMOUNT OF ELECTRIC POWER C \ LOAD OF VEHICLE | $0 < Ia \leq Ia^*$ | $Ia^* < Ia$ |
|---|---|---|
| $C max < C$ | DRIVING ⇔ THREE-PHASE SHORT CIRCUIT | POWER GENERATION ⇔ THREE-PHASE SHORT CIRCUIT |
| $C min \leq C \leq C max$ | DRIVING ⇔ POWER GENERATION | ADJUSTMENT OF AMOUNT OF ELECTRIC POWER GENERATION |
| $C < C min$ | POWER GENERATION (WITHOUT ROTATIONAL FLUCTUATION CONTROL) | ADJUSTMENT OF AMOUNT OF ELECTRIC POWER GENERATION |

FIG. 6

| ROTATIONAL SPEED Ne | POWER GENERATION METHOD |
|---|---|
| $Ne \leq Nmin$ | CHOPPING POWER GENERATION |
| $Nmin < Ne \leq Nmax$ | CHOPPING POWER GENERATION ⇔ DIODE-OPERATED RECTIFICATION POWER GENERATION |
| $Nmax < Ne$ | DIODE-OPERATED RECTIFICATION POWER GENERATION |

FIG. 9

MAP M1  (HOWEVER, ta<tb<tc)

| ESTIMATED STOP TIME t | 0<t≦ta | ta<t≦tb | tb<t≦tc |
|---|---|---|---|
| INTERNAL COMBUSTION ENGINE OPERATION MODE | IDLING | IDLE ASSISTANCE | ISS |

CONTROL APPARATUS FOR INTERNAL COMBUSTION ENGINE

BACKGROUND OF THE INVENTION

1. Field of the Invention

The present invention relates to a control apparatus for a internal combustion engine installed on a vehicle, and in particular, to a control apparatus for an internal combustion engine in which the stability of the operating state of the internal combustion engine is improved by controlling a rotating electrical machine connected to the internal combustion engine for both electric driving and electric power generation.

2. Description of the Related Art

Conventionally, there has been proposed a control apparatus which serves to suppress the variation of the rotational speed of an internal combustion engine by using a rotating electrical machine connected to the internal combustion engine installed on a vehicle for electric driving as well as electric power generation.

In general, the conventional control apparatus for an internal combustion engine controls the generated torque of the rotating electrical machine so as to counteract the rotational fluctuation of the internal combustion engine by switching the operating state of the rotating electrical machine between an electrically operating or driving state and a power generation state (see, for example, a first patent document: Japanese patent No. 2617936).

In the conventional apparatus as described in the above-mentioned first patent document, in order to suppress the rotational fluctuation of the internal combustion engine (i.e., to suppress the generated torque), the operating state of the internal combustion engine is switched between the electrically operating state and the power generation state thereby to generate torque pulsating in a direction opposite to that of the rotational fluctuation of the internal combustion engine.

At this time, the average value of the output of the rotating electrical machine becomes an amount of electric power generation for supplying an amount of output corresponding to the amount of load of the vehicle. Here, note that a power supply system (e.g., a battery, a capacitor, etc.) is connected to the rotating electrical machine.

In the conventional control apparatus for an internal combustion engine, no consideration is given to the charged state of the power supply system connected to the rotating electrical machine, so in case where the charged state of the power supply system is a full charged state, the power supply system becomes an overcharged state when the amount of electric power generation of the rotating electrical machine becomes larger than the electric power load of the vehicle, as a result of which there is a problem of causing adverse influences such as a reduction in service life, etc., to the power supply system.

SUMMARY OF THE INVENTION

Accordingly, an object of the present invention is to obtain a control apparatus for an internal combustion engine which is capable of suppressing the rotational fluctuation of the internal combustion engine in an effective manner by properly controlling the operating state of a rotating electrical machine without applying an inappropriate or excessive load to a power supply system connected to the rotating electrical machine.

Bearing the above object in mind, a control apparatus for an internal combustion engine according to the present invention includes: a rotating electrical machine for both electric operation and electric power generation that is connected to the internal combustion engine; a control circuit that controls at least one of a field current and an armature current of the rotating electrical machine; a rotational speed detection part that detects the individual rotational speeds of the internal combustion engine and the rotating electrical machine; a power supply system connected to the rotating electrical machine; an electric power detection part that detects an amount of electric power of the power supply system; and a rotational fluctuation suppression section that suppresses the rotational fluctuation of the internal combustion engine. The rotational fluctuation suppression section controls an amount of electric power generation and generated torque from the rotating electrical machine in accordance with an electric power load of the vehicle, the amount of electric power of the power supply system, and the rotational speed of the rotating electrical machine.

According to the present invention, by controlling the field current or the armature current of the rotating electrical machine based on the rotational speeds of the internal combustion engine and the rotating electrical machine, the amount of electric energy or power (the amount of charged electric power) of the power supply system, and the electric power load of the vehicle, the generated torque of the rotating electrical machine is controlled to suppress the rotational fluctuation of the internal combustion engine, whereby the ride comfort of the vehicle can be improved particularly during low speed rotation of the internal combustion engine of which the rotational fluctuation is large, and the fuel mileage of the vehicle can also be improved.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIG. 5 is an explanatory view showing one example of a control map of a rotating electrical machine according to a fifth embodiment of the present invention.

FIG. 6 is an explanatory view showing another example of a control map of the rotating electrical machine according to the fifth embodiment of the present invention.

FIG. 9 is an explanatory view showing one example of a control map of an internal combustion engine according to the sixth embodiment of the present invention.

DESCRIPTION OF THE PREFERRED EMBODIMENTS

Hereinafter, preferred embodiments of the present invention will be described in detail while referring to the accompanying drawings.

Embodiment 1

Figure 1:
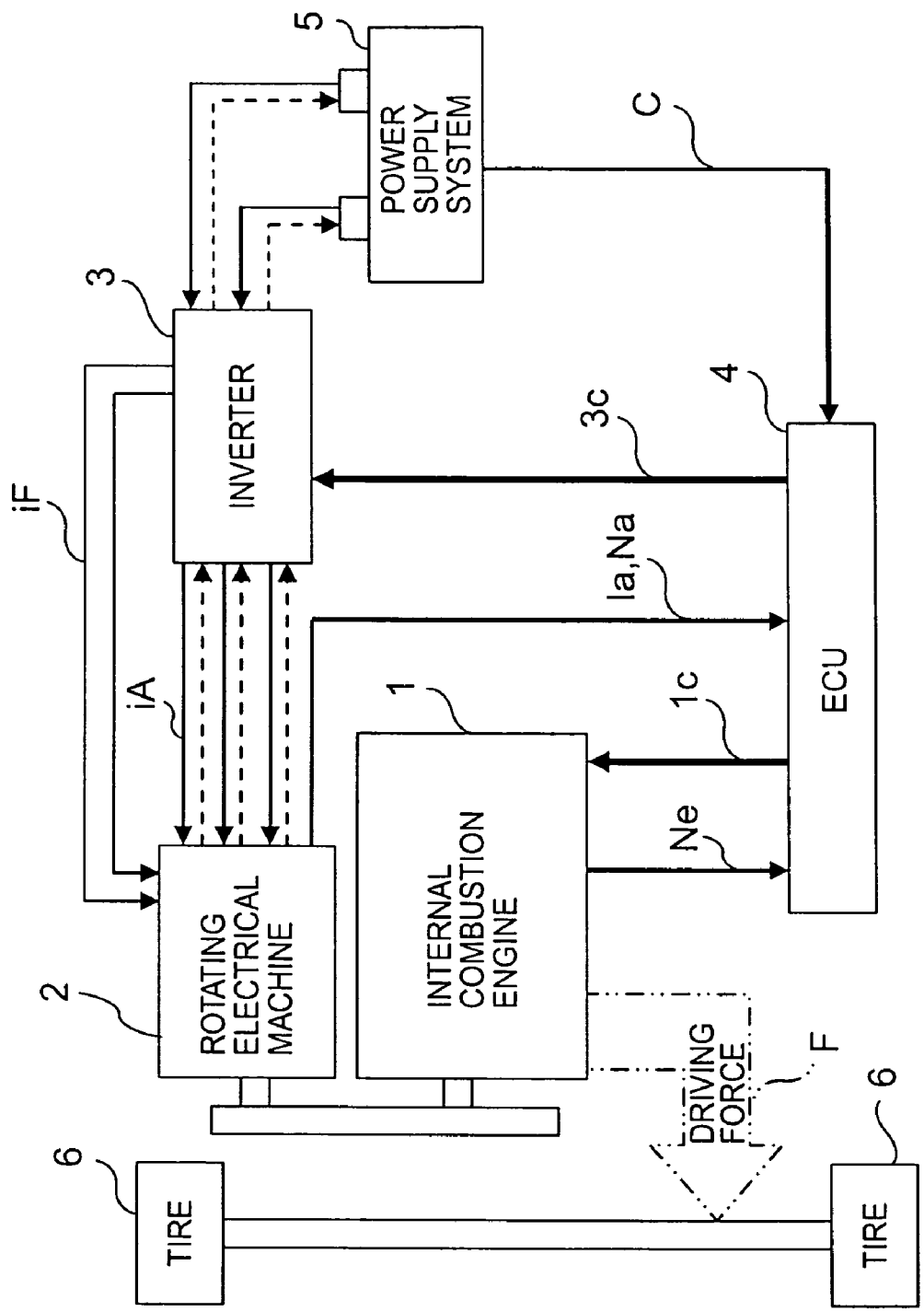
FIG. 1 is a block diagram showing a control apparatus for an internal combustion engine according to a first embodiment of the present invention, in which an example of the control apparatus for a vehicle system is diagrammatically illustrated.

Referring to the drawings and first to FIG. 1, there is shown a control apparatus for an internal combustion engine according to a first embodiment of the present invention, in which the control apparatus in a state installed on a vehicle system is diagrammatically illustrated.

In FIG. 1, an internal combustion engine 1 such as a gasoline engine is installed on a vehicle and is operatively connected to tires or wheels 6 of the vehicle, and a rotating electrical machine 2 for both electric operation and electric power generation has a rotation shaft mechanically connected with a rotation shaft of the internal combustion engine 1.

In addition, a power supply system 5 comprising a battery, a capacitor, etc., is connected to the rotating electrical machine 2 through an inverter (control circuit) 3 which performs three-phase DC conversion. The rotating electrical machine 2 is controlled under the control of an ECU (electronic control unit) 4 through the inverter 3. The inverter 3 controls a field current iF for the rotating electrical machine 2 in such a manner that when the rotating electrical machine 2 operates as an electric motor, a required amount of armature current iA is supplied to the rotating electrical machine 2 so as to assist the output torque of the internal combustion engine 1. Also, when the rotating electrical machine 2 operates as an electric motor, the inverter 3 charges the power supply system 5 with an amount of electric power generation corresponding to the armature current iA from the rotating electrical machine 2.

A rotational speed Ne of the internal combustion engine 1, an amount of electric power generation 1a of the rotating electrical machine 2, and an amount of electric energy or power (the amount of charged electric power) C of the power supply system 5 are input to the ECU 4 as information on vehicle conditions. In addition, a rotational speed Na of the rotating electrical machine 2 is input to the ECU 4. Further, as will be described later, detected information (vehicle conditions, information outside the vehicle) from various kinds of sensors is also input to the ECU 4. The various kinds of sensors include a rotation speed detection part that detects the individual rotational speeds Ne, Na of the internal combustion engine 1 and the rotating electrical machine 2, respectively, and an electric power detection part that detects the amount of electric energy or power C of the power supply system 5. For example, information such as the rotational speed Ne of the internal combustion engine 1, the rotational speed Na of the rotating electrical machine 2, the electric power load of the vehicle, the amount of electric energy or power C of the power supply system 5, etc., is input to the ECU 4.

The ECU 4 calculates and outputs a control command 1c to the internal combustion engine 1 and a control command 3c to the inverter 3 based on the various kinds of input information, so that the operating state of the rotating electrical machine 2 is thereby controlled through the internal combustion engine 1 and the inverter 3. The ECU 4 controls the rotational speed Ne of the internal combustion engine 1 by means of the control command 1c to the internal combustion engine 1, and controls at least one of the field current iF and the armature current iA of the rotating electrical machine 2 by means of the control command 3c to the inverter 3. The tires or wheels 6 of the vehicle are driven to rotate by the output torque of the internal combustion engine 1 as a power source (driving force).

In addition, the ECU 4 includes a rotational fluctuation suppression section that suppresses the rotational fluctuation of the internal combustion engine 1. The rotational fluctuation suppression section in the ECU 4 controls the amount of electric power generation 1a and the generated torque Ta from the rotating electrical machine 2 in accordance with the electric power load of the vehicle, the amount of electric power C of the power supply system 5, and the rotational speed Na of the rotating electrical machine 2.

Figure 2:
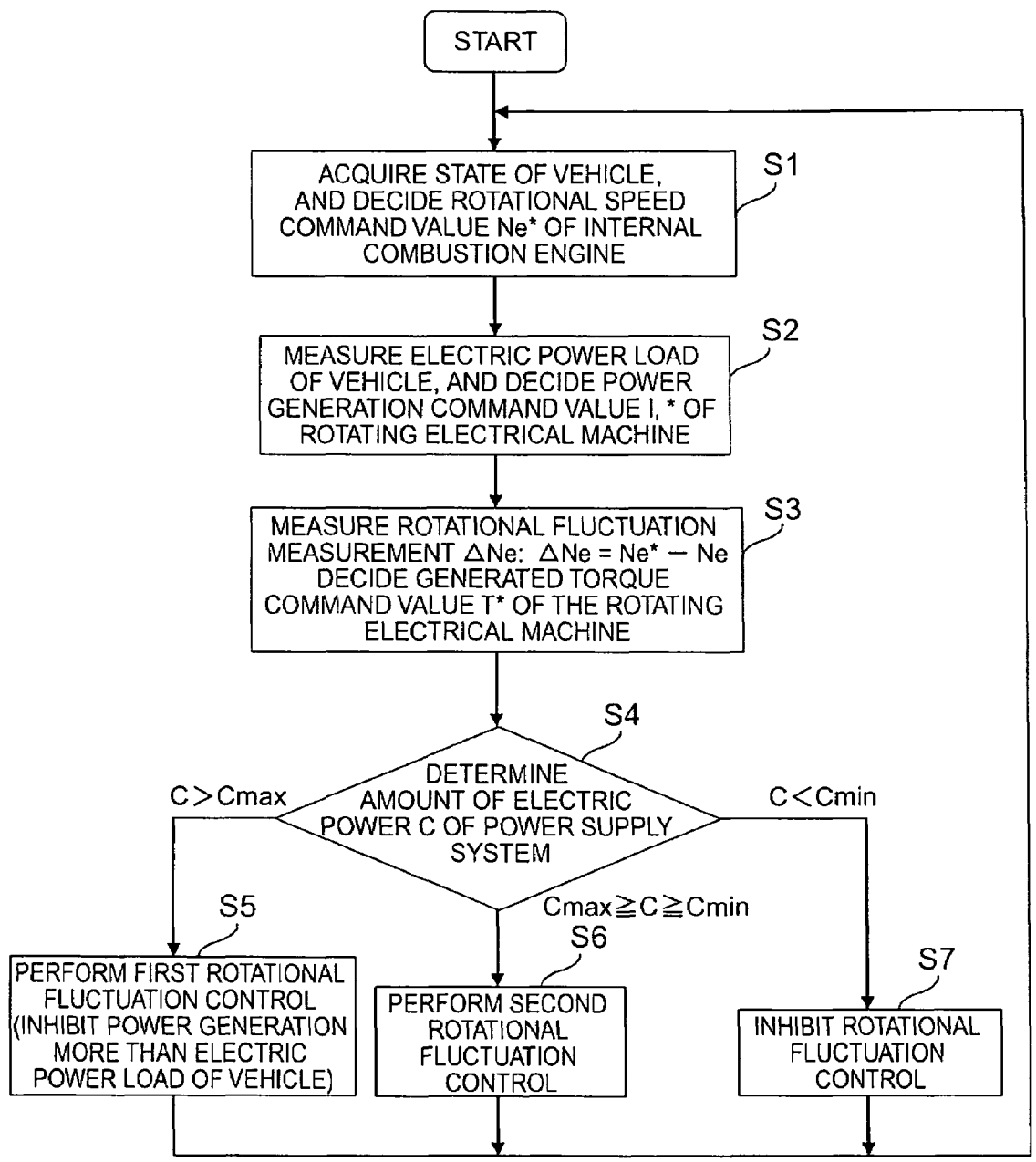
FIG. 2 is a flow chart illustrating a control operation according to the first embodiment of the present invention.

Next, reference will be made to the rotational fluctuation suppression operation of the internal combustion engine 1 according to the first embodiment of the present invention as shown in FIG. 1, while referring to FIG. 2. FIG. 2 is a flow chart that illustrates an algorithm of the control operation of the ECU 4 according to the first embodiment of the present invention.

In FIG. 2, first of all, the ECU 4 decides a rotational speed command value Ne* of the internal combustion engine 1 in accordance with vehicle condition information from the various kinds of sensors and commands from the driver (step S1). In addition, the ECU 4 decides a power generation command value $1a^*$ of the rotating electrical machine 2 based on the electric power load of the vehicle (step S2).

Subsequently, the rotational speed Ne (measured value) of the internal combustion engine 1 is read out from the various kinds of sensors (rotation speed detection part) installed on the internal combustion engine 1, and a speed deviation ΔNe (=Ne*−Ne) between the rotational speed Ne thus read out and the rotational speed command value Ne* is calculated as a value corresponding to a rotational fluctuation, and thereafter a generated torque command value T* of the rotating electrical machine 2 to counteract the rotational fluctuation of the internal combustion engine 1 is decided (step S3).

Then, the amount of electric power C (measured value) of the power supply system 5 is read out, and it is determined to which one of three ranges the level of the amount of electric power C belongs, by comparing the amount of electric power C with an upper limit threshold Cmax and a lower limit threshold Cmin, respectively (step S4).

When it is determined as C>Cmax in step S4 (i.e., the amount of electric power C being nearly in a fully charged state), first rotational fluctuation control is executed so that the amount of electric power generation Ia of the rotating electrical machine 2 is controlled so as not to generate electricity more than the electric power load of the vehicle (step S5), and then a return to step S1 is carried out.

At this time, the power supply system 5 is nearly in a full charged state, so if the amount of electric power generation C increases more than the electric power load of the vehicle, excessive electric power will be supplied to the power supply system 5, which, as a result, becomes an overcharged state. Accordingly, it is necessary to control the amount of electric power generation of the rotating electrical machine 2 so as to inhibit power generation more than the electric power load of the vehicle.

On the other hand, when it is determined in step S4 as Cmax≧C≧Cmin (i.e., the amount of electric power C being in a normal range where it is less than or equal to a full charged amount), second rotational fluctuation control is executed, and a return to step S1 is carried out (step S6).

In this case, an amount of change in the amount of electric power generation Ia of the rotating electrical machine 2 with respect to the electric power load of the vehicle is compensated (replenished or absorbed) by the power supply system 5, so the generated torque Ta of the rotating electrical machine 2 can be controlled in a direction to suppress the rotational fluctuation (the speed deviation ΔNe) of the internal combustion engine 1.

In addition, when it is determined in step S4 as C<Cmin (i.e., the amount of electric power C being extremely limited), all kinds of rotational fluctuation control are inhibited (step S7), and a return to step S1 is carried out. In this case, the amount of electric power C of the power supply system 5 is less than the lower limit threshold Cmin, so if a short amount of electric power by which the amount of electric power generation of the rotating electrical machine 2 is less than the electric power load of the vehicle is to be replenished from the power supply system 5 so as to suppress the rotational fluctuation of the internal combustion engine 1, the power supply system 5 becomes an overdischarged state. Accordingly, to avoid such a situation, it is necessary to inhibit the rotational fluctuation control so as to suppress the rotational fluctuation of the internal combustion engine 1.

Thus, by switching the control of the rotating electrical machine 2 in accordance with the respective levels of the amount of electric power C of the power supply system 5, it is possible to prevent the power supply system 5 from becoming an overcharged state and an overdischarged state, whereby the troubles such as the reduction in service life, firing, etc., of the power supply system 5 can be prevented.

In addition, the rotational fluctuation of the internal combustion engine 1 can be suppressed without loading the power supply system 5. Particularly, the ride comfort of the vehicle during idling in which the internal combustion engine 1 is operated at low rotational speed can be improved.

Further, the ride comfort is not likely to deteriorate even if the rotational speed of the internal combustion engine 1 is controlled to be lower than the general idle rotational speed thereof, so the idle rotational speed can be further lowered, thus making it possible to improve fuel economy.

As described above, according to the first embodiment of the present invention, the control apparatus for an internal combustion engine includes the rotating electrical machine 2 for electric operation and electric power generation connected to the internal combustion engine 1, and the power supply system 5 connected to the rotating electrical machine 2, wherein the generated torque Ta of the rotating electrical machine 2 is controlled to suppress the rotational fluctuation of the internal combustion engine 1 by controlling the field current iF or the armature current iA of the rotating electrical machine 2 based on the individual rotational speeds Ne, Na of the internal combustion engine 1 and the rotating electrical machine 2, the amount of electric power C of the power supply system 5, and information on the electric power load of the vehicle.

At this time, when the amount of electric power C of the power supply system 5 is within the steady-state range that is less than or equal to the upper limit threshold Cmax, the generated torque Ta of the rotating electrical machine 2 is changed so as to suppress the rotational fluctuation of the internal combustion engine 1 according to the second rotational fluctuation control, whereas when the amount of electric power C exceeds the upper limit threshold Cmax, the rotating electrical machine 2 is controlled to keep the amount of electric power generation 1a among the total output of the rotating electrical machine 2 at a constant value (or 0) so as to prevent the power supply system 5 from being overcharged.

Thus, the overcharge of the power supply system 5 can be prevented by keeping the amount of electric power generation constant, whereby the troubles such as the reduction in service life, firing, etc., of the power supply system 5 can be prevented.

In addition, by suppressing the rotational fluctuation of the internal combustion engine 1, it is possible to improve the ride comfort particularly during the low speed rotation (idling) of the internal combustion engine 1 in which the rotational fluctuation thereof is large. Also, the rotational speed during idling in which the internal combustion engine 1 is operated to rotate at low speed can be further lowered, thus making it possible to improve the fuel economy of the vehicle.

Embodiment 2

Though no particular mention is made in the above-mentioned first embodiment, when the generated torque Te of the internal combustion engine 1 is increased in the first rotational fluctuation control (step S5 in FIG. 2), the power generation efficiency of the rotating electrical machine 2 may be reduced.

Figure 3:
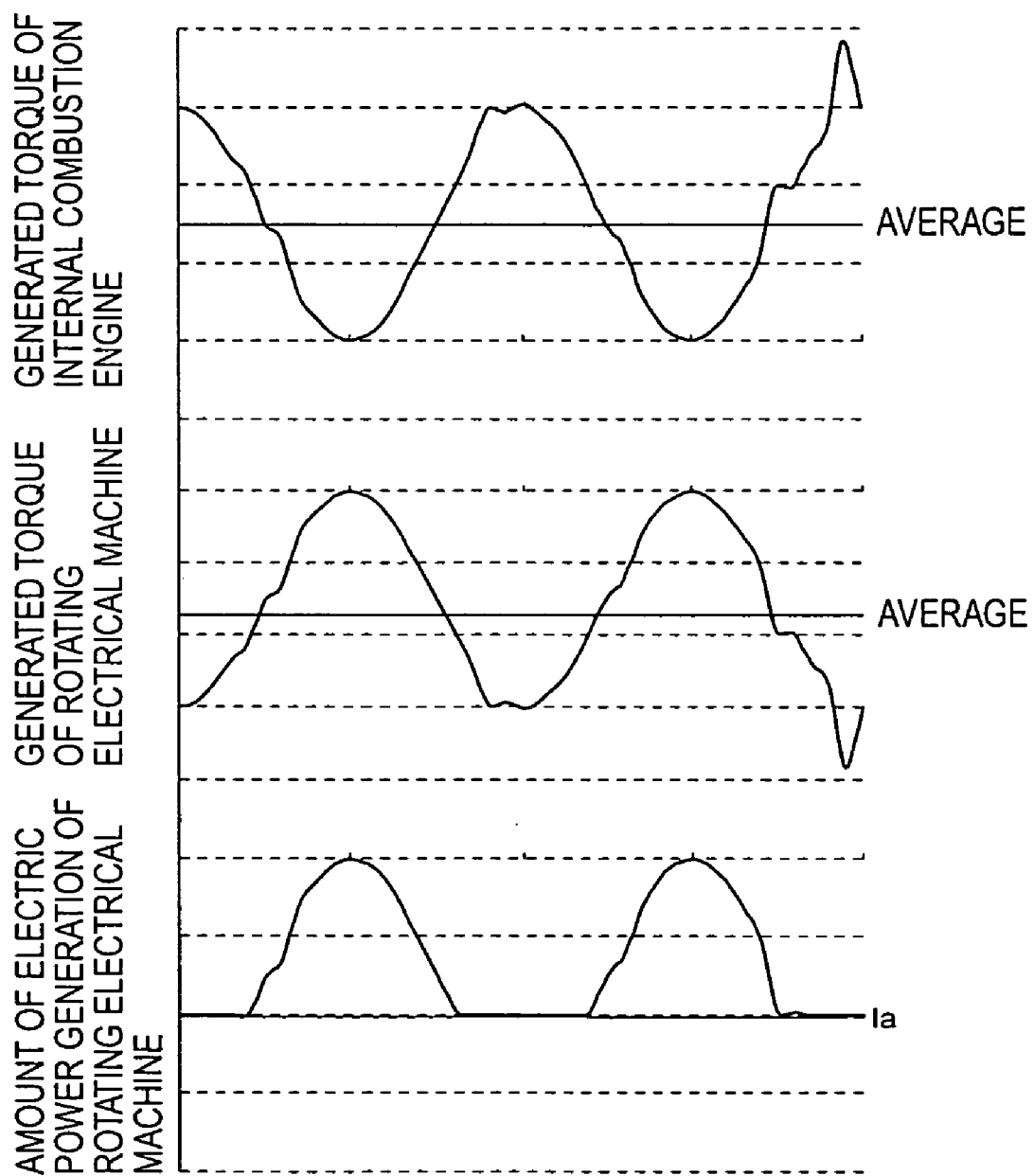
FIG. 3 is a waveform chart showing the changes over time of the amount of generated electric power and the generated torque during control operation according to a second embodiment of the present invention.

FIG. 3 is a waveform chart that shows the operation of a control apparatus for an internal combustion engine according to a second embodiment of the present invention, in which the power generation efficiency of a rotating electrical machine 2 is reduced when the generated torque Te of an internal combustion engine 1 is increased, with the rotational fluctuation being generated in the internal combustion engine 1.

The waveform chart of FIG. 3 shows the changes over time of the amount of electric power generation 1a and the generated torque Ta of the rotating electrical machine 2 and the generated torque Te of the internal combustion engine 1 when first rotational fluctuation control is carried out (in case where the amount of electric power C of a power supply system 5 is nearly in a full charged state).

In FIG. 3, the generated torque Te of the internal combustion engine 1 increases and decreases with the elapse of time in accordance with the rotational fluctuation of the internal combustion engine 1. In this case, a rotational fluctuation suppression section in an ECU 4 is constructed so as to variably control the efficiency of the rotating electrical machine 2, wherein when the generated torque Te of the internal combustion engine 1 increases, the power generation efficiency of the rotating electrical machine 2 is reduced so as to set the amount of electric power generation 1a to a fixed or constant value, as shown in FIG. 3. That is, when the generated torque Te of the internal combustion engine 1 increases in the first rotational fluctuation control of the rotating electrical machine 2 (step S5), the rotating electrical machine 2 is controlled in such a manner that an excessive amount of generated torque Te is absorbed by lowering the power generation efficiency of the rotating electrical machine 2 in an appropriate manner.

Though the rotating electrical machine 2 receives the generated torque Te from the internal combustion engine 1 thereby to generate electricity, it generally converts the generated torque Ta into an amount of electric power generation 1a at the highest conversion efficiency which the rotating electrical machine 2 can output so as not to consume extra energy.

However, in case where the generated torque Te increases due to the rotational fluctuation of the internal combustion engine 1, the amount of electric power generation 1a will increase when the amount of torque increase is to be consumed by the rotating electrical machine 2, so an amount of power generation more than the electric power load of the vehicle will be performed.

At this time, when the amount of electric power C of the power supply system 5 is lower than that in the fully charged state, an increase in the amount of electric power generation 1a can be absorbed by charging the power supply system 5, but when the power supply system 5 is nearly in the fully charged state, the increase in the amount of electric power generation 1a can not be absorbed by the power supply system 5, so the power supply system 5 becomes an overcharged state.

Accordingly, it is desirable that when the generated torque Te of the internal combustion engine 1 increases with the power supply system 5 being in the fully charged state, the amount of torque to be consumed be increased by lowering the power generation efficiency of the rotating electrical machine 2 without changing the amount of electric power generation 1a of the rotating electrical machine 2, whereby an amount of generated torque Te corresponding to the rotational fluctuation of the internal combustion engine 1 is absorbed.

Thus, by controlling to lower the power generation efficiency of the rotating electrical machine 2, it is possible to prevent the power supply system 5 from becoming an overcharged state, as stated above, so troubles such as the reduction in service life, firing, etc., of the power supply system 5 can be prevented.

In addition, the amount of electric power generation of the rotating electrical machine 2 can be kept constant by controlling the efficiency of the rotating electrical machine 2 in a variable manner, and besides, the overcharge of the power supply system 5 can be prevented when the amount of electric power C of the power supply system 5 is equal to or more than an upper limit threshold Cmax.

Further, by suppressing the rotational fluctuation of the internal combustion engine 1, the ride comfort of the vehicle can be improved, as stated above, and the rotational speed of the internal combustion engine 1 during idling can be further lowered, thus making it possible to improve the fuel economy of the vehicle.

Embodiment 3

Although no particular mention is made in the above-mentioned first embodiment, in the first rotational fluctuation control (step S5 in FIG. 2), the operating state of the rotating electric machine 2 may be switched between an ordinary power generation state and a three-phase short circuited state.

Figure 4:
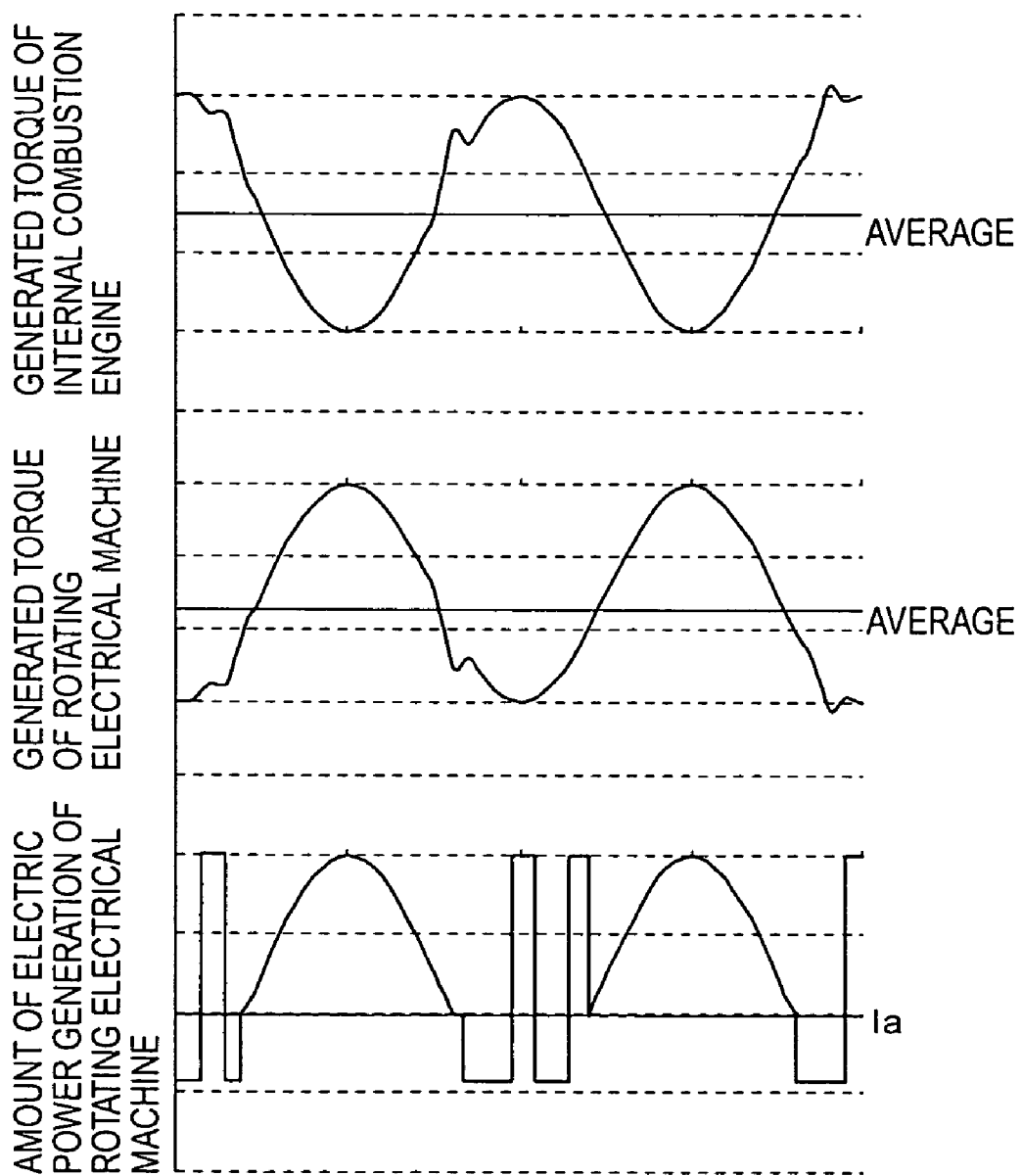
FIG. 4 is a waveform chart showing the changes over time of the amount of generated electric power and the generated torque during control operation according to a third embodiment of the present invention.

FIG. 4 is a waveform chart that shows the operation of a control apparatus for an internal combustion engine according to a third embodiment of the present invention, in which the operating state of a rotating electrical machine 2 is switched between a power generation state and a three-phase short circuited state. Similarly as stated above (see FIG. 3), the waveform chart of FIG. 4 shows the changes over time of the amount of electric power generation Ia and the generated torque Ta of the rotating electrical machine 2 and the generated torque Te of the internal combustion engine 1 when first rotational fluctuation control is carried out (in case where the amount of electric power C of a power supply system 5 is nearly in a full charged state).

In this case, a rotational fluctuation suppression section in an ECU 4 is constructed such that the operating state of the rotating electrical machine 2 is switched among a driving state, a power generation state, and a three-phase short circuited state. That is, in order to suppress the rotational fluctuation of the internal combustion engine 1 in the first rotational fluctuation control (step S5), the rotating electrical machine 2 is controlled to switch between the ordinary power generation state and the three-phase short circuited state so as to absorb an excessive generated torque Te from the internal combustion engine 1.

In FIG. 4, the above-mentioned switching control is indicated by rectangular waves. For example, when the rotating electrical machine 2 is made into a three-phase short circuited state, the amount of electric power generation Ia becomes 0, so that the generated torque Te of the internal combustion engine 1 can be absorbed in accordance with the field current iF. Accordingly, in case where the rotational speed of the internal combustion engine 1 is increased by the rotational fluctuation thereof and hence the generated torque Te of the internal combustion engine 1 that should be absorbed by the rotating electrical machine 2 becomes large, it is possible to absorb the generated torque Te can be absorbed by controlling the amount of electric power generation Ia to zero without generating electricity. At this time, in case where there exists an electric power load of the vehicle, an amount of electric power generation Ia corresponding to the electric power load of the vehicle is supplied thereto from the rotating electrical machine 2 by optimally controlling the duty ratio of the three-phase short circuited state (Ia=0) and the power generation state.

As described above, in the first rotational fluctuation control, by controlling to switch the rotating electrical machine 2 among the driving state, the power generation state and the three-phase short circuited state, and by applying the three-phase short circuited state, the generated torque Te from the internal combustion engine 1 can be absorbed while making zero the amount of electric power generation 1a from the rotating electrical machine 2. Accordingly, as stated above, the overcharged state of the power supply system 5 can be avoided, so troubles such as the reduction in service life, firing, etc., of the power supply system 5 can be prevented. In addition, the ride comfort of the vehicle during the low speed rotation of the internal combustion engine 1 can be improved, and the rotational speed of the internal combustion engine 1 during idling can be further lowered, thus making it possible to improve the fuel economy of the vehicle.

Embodiment 4

Though not particularly described in the above-mentioned first embodiment, in the second rotational fluctuation control (step S6 in FIG. 2), the operating state of the rotating electric machine 2 may be switched between an ordinary power generation state and a step-up chopper-operated power generation state.

In this case, a rotational fluctuation suppression section in an ECU 4 is constructed such that the operating state of the rotating electrical machine 2 is switched among a driving state, a power generation state, and a transistor-operated chopping power generation state. That is, in the second rotational fluctuation control (step S6) when the amount of electric power C of a power supply system 5 is within a steady-state range, in order to suppress the rotational fluctuation of the internal combustion engine 1, the operating state of the rotating electrical machine 2 is switched between an ordinary power generation state and a step-up chopper-operated power generation state.

Although in general, the amount of electric power generation Ia of the rotating electrical machine 2 depends on the rotational speed Na of the rotating electrical machine 2, the generated voltage becomes lower than a battery charge voltage (a terminal voltage of the power supply system 5) during the low speed rotation of the internal combustion engine 1, so electric power generation can not be performed.

Accordingly, to generate electricity during the low speed rotation of the internal combustion engine 1, it is necessary to raise the generated voltage for generation of electricity by means of a step-up chopper. In particular, if the rotational speed Ne of the internal combustion engine 1 is lowered during the low speed rotation thereof (idling, etc.), the rotational fluctuation of the internal combustion engine 1 becomes larger so the minimum level of the rotational speed is further reduced, thus giving rise to a possibility that electricity can not be generated by the rotating electrical machine 2.

However, by raising the generation voltage of the rotating electrical machine 2 by means of the step-up chopper, it becomes possible to generate electricity with even lower rotational speed, so even if the idle rotational speed of the internal combustion engine 1 is reduced, control for suppression of the rotational fluctuation can be done.

Thus, as the control of the rotating electrical machine 2 to suppress the rotational fluctuation of the internal combustion engine 1, the operating state of the rotating electrical machine 2 is switched among the driving state, the ordinary power generation state, and the power generation state using transistor-operated chopping power generation, whereby the output of the internal combustion engine 1 can be taken out with even lower rotational speed of the rotating electrical machine 2 by performing chopping power generation by the use of a transistor. As a result, the rotational variation of the internal combustion engine 1 can be suppressed in a much wider rotational speed range.

In addition, by increasing the amount of electric power generation 1a of the rotating electrical machine 2 at low speed rotation, it is possible to prevent reduction in the amount of electric power C of the power supply system 5 in the second rotational fluctuation control (step S6). Further, the idle rotational speed can be lowered to a sufficient extent without deteriorating the ride comfort of the vehicle, so the fuel economy of the vehicle can be improved.

Embodiment 5

Although in the above-mentioned third and fourth embodiments, no specific mention is made to the selection condition of the switching control of the rotating electrical machine 2, switching may be made in accordance with the electric power load of the vehicle, the rotational speed Ne of the internal combustion engine 1, and the amount of electric power C of the power supply system 5.

FIG. 5 and FIG. 6 are explanatory views that respectively show operating state maps of a rotating electrical machine 2 according to a fifth embodiment of the present invention, in which the operating states of the rotating electrical machine 2 are illustrated which are selected in accordance with the electric power load of a vehicle, the rotational speed Ne of an internal combustion engine 1, and the amount of electric power C of a power supply system 5. In FIG. 5, there is illustrated one example of a map for selecting the operating state of the rotating electrical machine 2 (a driving state, a power generation state, and a three-phase short circuited state) based on the electric power load of the vehicle (corresponding to the amount of electric power generation Ia) and the amount of electric power C supplied from the power supply system 5. Also, in FIG. 6, there is illustrated one example of a map for selecting between power generation methods of the rotating electrical machine 2 (a diode-operated rectification power generation state according to a diode, and a chopping power generation state according to a transistor) based on the rotational speed Ne of the internal combustion engine 1.

In this case, a rotational fluctuation suppression section in the ECU 4 properly uses various kinds of control by switching the operating state of the rotating electrical machine 2 among four kinds of switching control states including a driving state, a power generation state, and a switching control state between a driving state and a power generation state, and a three-phase short circuited state in accordance with the electric power load of the vehicle (the amount of electric power generation Ia) and the amount of electric power C of the power supply system 5, and at the same time by switching the power generation state among a diode-operated rectification power generation state, a transistor-operated chopping power generation state, and a switching control state between a rectification power generation state and a chopping power generation state in accordance with the rotational speed Ne of the internal combustion engine 1.

That is, as the operating state of the rotating electrical machine 2, an optimal control state is selected from four kinds of control states including (1) a driving state as an electric motor, (2) an ordinary power generation control state, (3) a three-phase short circuited state for inhibiting power generation, and (4) a switching control state for switching between a driving state and a power generation state for suppression of rotational fluctuation in accordance with the amount of electric power generation 1a and the amount of electric power C.

In FIG. 5, in case where the amount of electric power generation Ia of the rotating electrical machine 2 (the load of the vehicle) is within a steady-state or regular range (0<Ia≦Ia*), when the amount of electric power C of the power supply system 5 exceeds an upper limit threshold Cmax, a switching control state of switching between a driving state and a three-phase short circuited state (power generation inhibition state) is selected; when the amount of electric power C is within a steady-state range (Cmin≦C≦Cmax), a switching control state of switching between a driving state and a power generation state is selected; and when the amount of electric power C falls below a lower limit threshold Cmin, the ordinary power generation state of inhibiting rotational fluctuation control is selected.

In addition, in FIG. 5, in case where the amount of electric power generation 1a of the rotating electrical machine 2 exceeds a power generation command value Ia*, when the amount of electric power C exceeds the upper limit threshold Cmax, a switching control state of switching between the power generation state and the three-phase short circuited state is selected, whereas when the amount of electric power C is less than or equal to the upper limit threshold Cmax, rotational fluctuation control according to the adjustment of the amount of electric power generation (the adjustment of the power generation efficiency according to the above-mentioned second embodiment) is executed.

On the other hand, in FIG. 6, the power generation control state of the rotating electrical machine 2 is controlled or selected as follows. That is, when the rotational speed Ne of the internal combustion engine 1 is lower than or equal to a lower limit threshold Nmin, a chopping (pressure raising) power generation state according to a transistor is selected; when the rotational speed Ne is within a steady-state or regular range (Nmin<Ne≦Nmax), a switching control state of switching between a chopping power generation and an ordinary diode-operated rectification power generation is selected; and when the rotational speed Ne exceeds an upper limit threshold Nmax, a diode-operated rectification power generation state is selected.

Thus, an optimal operating state of the rotating electrical machine 2 is selected, according to the map of FIG. 5, from among the driving state, the power generation state, and the three-phase short circuited state in accordance with the electric power load of the vehicle and the amount of electric power C of the power supply system 5. In addition, as shown in FIG. 6, particularly for the power generation state of the rotating electrical machine 2, the diode rectification power generation or chopping power generation is selected in accordance with the rotational speed Ne of the internal combustion engine 1. As a result, the fine control of the operating state matched to the vehicle condition can be achieved, and the rotational fluctuation of the internal combustion engine 1 can be suppressed more effectively, so thereby making it possible to reduce the idle rotational speed and to protect the power supply system 5.

Also, as stated above, the amount of electric power generation 1a of the rotating electrical machine 2 can be kept constant by changing the efficiency of the rotating electrical machine 2, and the overcharge of the power supply system 5 can be prevented when the amount of electric power C of the power supply system 5 is equal to or more than the upper limit threshold Cmax, thereby making it possible to prevent the troubles such as the reduction in service life, firing, etc., of the power supply system 5.

Moreover, by switching the operating state of the rotating electrical machine 2 into the three-phase short circuited state, it is possible to absorb the generated torque Te from the internal combustion engine 1 while making zero the amount of electric power generation 1a from the rotating electrical machine 2, whereby the overcharge of the power supply system 5 can be prevented.

Further, by switching the driving state of the rotating electrical machine 2 into the chopping power generation state, it becomes possible to take out the output of the internal combustion engine 1 even with the still lower rotational speed Na of the rotating electrical machine 2, and hence the rotational variation of the internal combustion engine 1 can be suppressed in a much wider rotational speed range.

Furthermore, the operating state of the rotating electrical machine 2 is selectively switched among the driving state, the power generation state, the three-phase short circuited state, and the transistor-operated chopping power generation state in accordance with the rotational speed Ne of the internal combustion engine 1, the amount of electric power C of the power supply system 5, and the electric power load of the vehicle (i.e., the amount of electric power generation Ia), and an operating state with the highest effect of suppressing the rotational fluctuation is selected, whereby the rotational fluctuation of the internal combustion engine 1 can be effectively improved, and at the same time the service life of the power supply system 5 can be made longer.

Embodiment 6

Although in the above-mentioned first through fifth embodiments, no consideration is given to a stop time of a vehicle to which an idle assist state is applied, an estimated stop time t of the vehicle is obtained, and an operating state of the internal combustion engine 1 may be selected during the stop time.

Hereinafter, reference will be made to a sixth embodiment of the present invention in which an operating state of an internal combustion engine 1 is selected in accordance with an estimated stop time t of a vehicle while referring to FIG. 7 through FIG. 9 together with FIG. 1.

Figure 7:
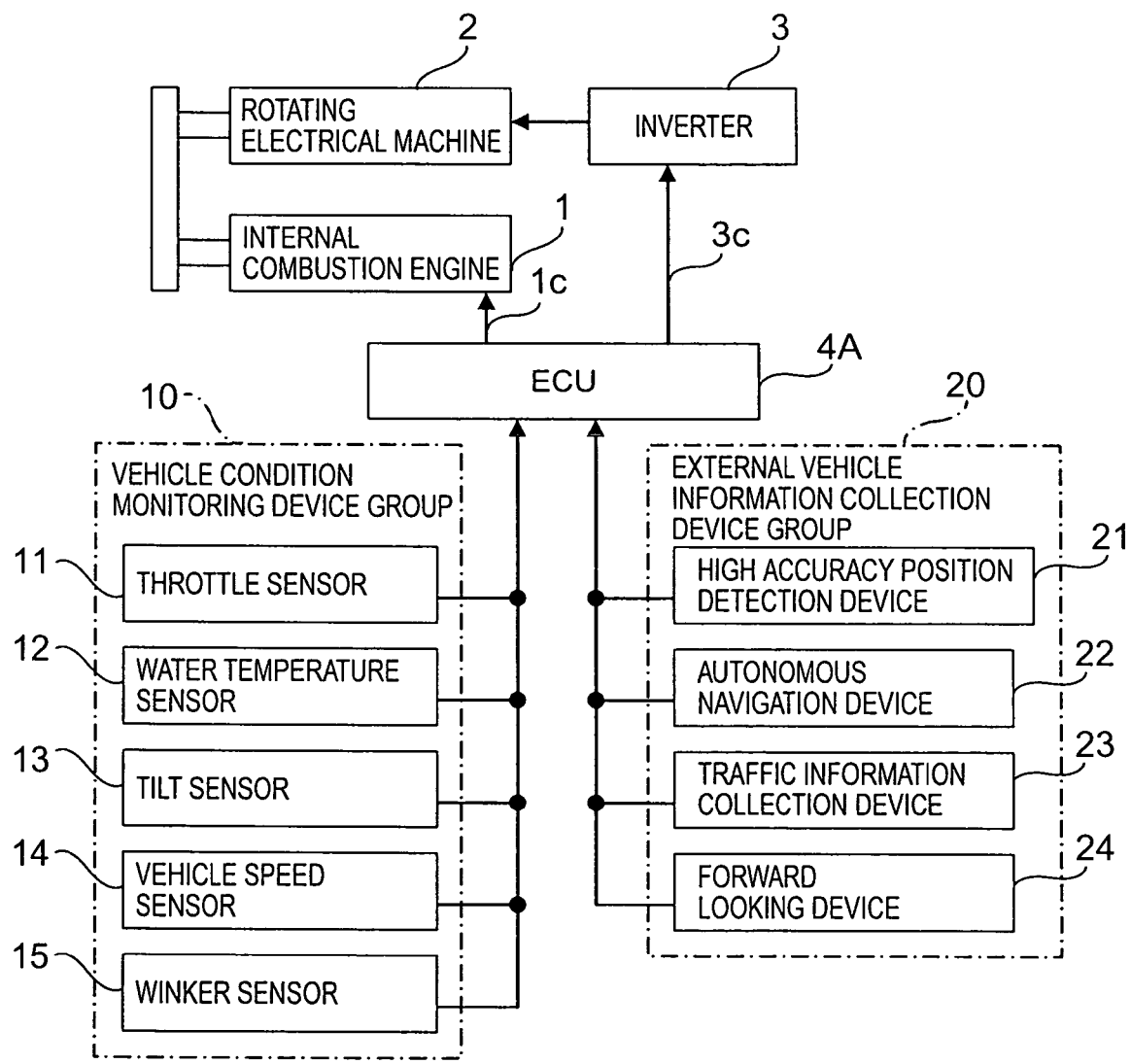
FIG. 7 is a block diagram showing a control apparatus for an internal combustion engine according to a sixth embodiment of the present invention, in which an example of the control apparatus for a vehicle system is diagrammatically illustrated.

FIG. 7 is a block diagram showing the schematic construction of a vehicle system on which a control apparatus for an internal combustion engine according to the sixth embodiment of the present invention is installed, wherein like parts or components as those described above (see FIG. 1) are identified by the same symbols or by the same symbols with "A" affixed to their ends, while omitting a detailed explanation thereof. In addition, those parts such as a power supply system 5, etc., which are not shown in FIG. 7, are as shown in FIG. 1. FIG. 8 is a flow chart that illustrates a control operation example according to the sixth embodiment of the present invention, and FIG. 9 is an explanatory view that shows one example of a control map M1 used for selection of an operating state according to the sixth embodiment of the present invention. In the map M1 of FIG. 9, reference times ta, tb, tc to be compared with the estimated stop time t are in the relation of ta<tb<tc, and the reference time tc corresponds to an upper limit threshold.

In FIG. 9, the operation mode of the internal combustion engine 1 is selected as follows. That is, an idle state is selected in case of t≦ta in which the estimated stop time t is extremely short; an idle assist state is selected in case of ta<t≦tb in which the estimated stop time t is in an intermediate range; and a stop and restart state (hereinafter abbreviated as an "ISS") is selected in case of tb<t≦tc in which the estimated stop time t is relatively long.

In FIG. 7, an ECU 4A includes a stop time estimation section that calculates the estimated stop time t of the vehicle and a state selection section that selects the state of the internal combustion engine 1 during the stop time of the vehicle. The state selection section in the ECU 4A selects either of the idle state using the internal combustion engine 1 alone, the idle state using the rotating electrical machine 2 together with the internal combustion engine 1, and the stop and restart state of the internal combustion engine 1 based on at least one of the estimated stop time t and the amount of electric power C of the power supply system 5. Also, the state selection section selects a state in which the best mileage can be obtained.

Similarly as stated above, the ECU 4A acquires information on the vehicle from various kinds of sensors mounted on the vehicle, and executes programs therein while using data stored therein beforehand thereby to control the operating states of the internal combustion engine 1 and the rotating electrical machine 2.

In addition, a vehicle state monitoring device group 10 and an external vehicle information collection device group 20 are connected to the ECU 4A as a dual system information collection device group. The ECU 4A decides the operating condition of the internal combustion engine 1 based on the information from the respective information collection device groups 10, 20 thereby to control the internal combustion engine 1.

The vehicle state monitoring device group 10 includes a throttle sensor 11 that detects the opening degree of a throttle valve (hereinafter also referred to as a throttle opening), a water temperature sensor 12 that detects the temperature of cooling water of the internal combustion engine 1, a tilt sensor 13 that detects the tilt or inclination of the vehicle, a vehicle speed sensor 14 that detects the travel speed of the vehicle, and a winker sensor 15 that detects the steering state of the vehicle.

The external vehicle information collection device group 20 includes a high accuracy position detection device 21 that detects the position of the vehicle with a high degree of precision, an autonomous navigation device 22 that automatically performs cruise control, a traffic information collection device 23 that collects real-time traffic information, and a forward looking device 24 that monitors the events in front of the vehicle.

In the external vehicle information collection device group 20, the high accuracy position detection device 21 measures the position of a subject vehicle (i.e., the vehicle on which the control apparatus of the present invention is installed) in units of few meters to few centimeters by making use of a global positioning system (i.e., GPS) using a plurality of space satellites with local FM stations being utilized as reference stations. The autonomous navigation device 22 verifies the travel path of the subject vehicle based on information from the vehicle speed sensor 14, a gyroscope, etc., thereby to further improve the detection accuracy of the high accuracy position detection device 21. The traffic information collection device 23 acquires the status of traffic signals at intersections, time information on signal changes, traffic status information of a route on which the subject vehicle is traveling and so on. The forward looking device 24 detects a preceding vehicle by means of a laser radar, a millimeter wave radar, for example, and monitors the travel course of the preceding vehicle by using various kinds of cameras.

The ECU 4A verifies the driving state of the internal combustion engine 1 and driver's instructions by using the throttle sensor 11 in the vehicle state monitoring device group 10, determines, based on the water temperature sensor 12, whether the internal combustion engine 1 has been warmed up, measures the tilt or inclination of the vehicle by using the tilt sensor 13, determines, based on the vehicle speed sensor 14, whether the subject vehicle is stopped, and verifies the driver's instruction for a right turn or a left turn by using the winker sensor 15. Also, the ECU 4A detects the position on the map of the subject vehicle based on the position information from the high accuracy position detection device 21 in the external vehicle information collection device group 20, and takes in information from the individual devices 22 through 24.

Now, reference will be made to the processing operation of the ECU 4A according to the sixth embodiment of the present invention as illustrated in FIG. 7 while referring to FIGS. 8 and 9.

Figure 8:
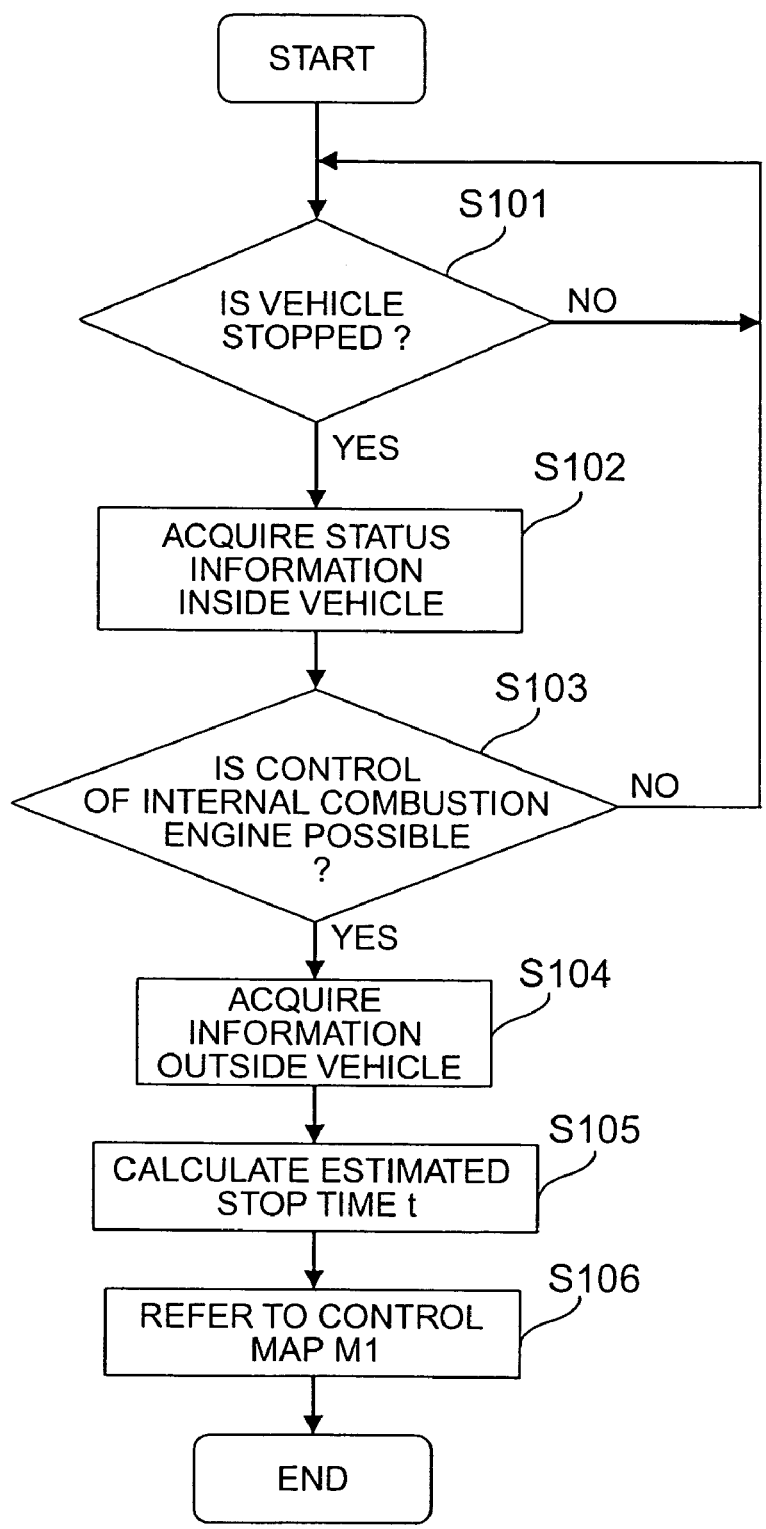
FIG. 8 is a flow chart illustrating a control operation according to the sixth embodiment of the present invention.

In FIG. 8, first of all, the vehicle speed information from the vehicle speed sensor 14 is verified so as to determine whether the subject vehicle is in a stopped state (step S101), and when it is determined that the subject vehicle is not in a stopped state (that is, NO), the determination step S101 is repeated, whereas when it is determined in step S101 that the subject vehicle is in a stopped state (that is, YES), the state of the vehicle is verified by using information (the warm-up state, the slope of the road, instructions of the driver, etc.) from the vehicle condition monitoring device group 10 (step S102).

Subsequently, in response to the warm-up state, the slope of the road, the instructions of the driver, etc., it is determined whether the control of the internal combustion engine 1 (idling, idle assistance, ISS, etc.) is executable (the execution requirement is satisfied) (step S103), and when it is determined that the control condition (i.e., the execution requirement) of the internal combustion engine 1 does not hold (that is, NO), a return to step S101 is carried out.

On the other hand, when it is determined in step S103 that the control condition of the internal combustion engine 1 holds (that is, YES), information outside the vehicle is acquired from the external vehicle information collection device group 20 (step S104), and an estimated stop time t of the vehicle is calculated based on the acquired information (step S105).

Finally, an operating condition of the internal combustion engine 1 is selected by using the map M1 illustrated in FIG. 9 (step S106), and the processing routine of FIG. 8 is terminated.

In step S106, an operating state that most meets an intended purpose from among the idle state, the idle assist state and the ISS state is selected in accordance with the estimated stop time t thus calculated.

Here, note that in the idle assist state, the rotational speed Ne of the internal combustion engine 1 is lowered from that in the ordinary idle state. As a result, the consumption of fuel can be suppressed, and the operation of the internal combustion engine 1 is not stopped, so the following starting of the vehicle can be carried out quickly.

Thus, by adopting, as the control mode of the internal combustion engine 1, the idle assist state based on the estimated stop time t thus calculated, the rotational speed of the internal combustion engine 1 can be reduced to a satisfactory extent even in a relatively short time stop, thus making it possible to improve fuel mileage and at the same time to achieve a quick start of the vehicle.

In addition, since the internal combustion engine 1 is moving or operating in the idle assist state, fuel mileage can be improved even in a steep slope, in which it is difficult for a conventional vehicle to satisfy the ISS condition or state, by lowering the rotational speed of the internal combustion engine 1 in the idle assist state.

As described above, according to the sixth embodiment of the present invention, the estimated stop time t is calculated based on information from the vehicle condition monitoring device group 10 (various kinds of sensors, etc., mounted on the vehicle), the external vehicle information collection device group 20, etc., and in accordance with the length of the estimated stop time t, either one is selected, as the operating state of the internal combustion engine 1, from among the idle state of only the internal combustion engine 1 (the ordinary idle state), the idle state in which the rotational fluctuation of the internal combustion engine 1 is suppressed by the rotating electrical machine 2 to reduce the rotational speed Ne of the internal combustion engine 1 from the ordinary one (the idle assist state), and the stop and restart state of the internal combustion engine 1 (the ISS state).

Accordingly, the operating state of the internal combustion engine 1 when the vehicle is stopped can be controlled in a much finer manner, so it is possible to select an appropriate operating state of the internal combustion engine 1 that is matched to an intended purpose. Specifically, by applying the control of the idle assist state, the control mode of the internal combustion engine 1 can be finely set in accordance with the estimated stop time t, thereby making it possible to improve fuel mileage.

In addition, fuel mileage can also be improved by selecting, from among the idle state, the idle assist state and the ISS state, an appropriate control mode of the operating state of the internal combustion engine 1 during stop of the vehicle in which the best fuel mileage can be obtained, in accordance with the estimated stop time t thus calculated. Specifically, as shown in the control map M1 (FIG. 9), the state selection section in the ECU 4A compares the estimated stop time t with a first reference time ta and a second reference time tb which is longer than the first reference time ta, and selects, as a control mode of the internal combustion engine 1, the idle state when the estimated stop time t is less than or equal to the first reference time ta, the idle assist state when the estimated stop time t is longer than the first reference time ta and less than or equal to the second reference time tb, and the stop and restart state when the estimated stop time t is longer than the second reference time tb, whereby fuel mileage can be improved.

While the invention has been described in terms of preferred embodiments, those skilled in the art will recognize that the invention can be practiced with modifications within the spirit and scope of the appended claims.

What is claimed is:

1. A control apparatus for an internal combustion engine installed on a vehicle, comprising:
    a rotating electrical machine for both electric operation and electric power generation that is connected to said internal combustion engine;
    a control circuit that controls at least one of a field current and an armature current of said rotating electrical machine;
    a rotational speed detection part that detects the individual rotational speeds of said internal combustion engine and said rotating electrical machine;
    a power supply system connected to said rotating electrical machine;
    an electric power detection part that detects an amount of electric power of said power supply system; and
    a rotational fluctuation suppression section that suppresses the rotational fluctuation of said internal combustion engine;
    wherein said rotational fluctuation suppression section controls an amount of electric power generation and generated torque from said rotating electrical machine in accordance with an electric power load of said vehicle, the amount of electric power of said power supply system, and the rotational speed of said rotating electrical machine.

2. The control apparatus for an internal combustion engine as set forth in claim 1, wherein
    said rotational fluctuation suppression section controls the efficiency of said rotating electrical machine in a variable manner.

3. The control apparatus for an internal combustion engine as set forth in claim 1, wherein
    said rotational fluctuation suppression section controls to switch the operating state of said rotating electrical machine among a driving state, a power generation state, and a three-phase short circuited state.

4. The control apparatus for an internal combustion engine as set forth in claim 1, wherein
    said rotational fluctuation suppression section controls to switch the operating state of said rotating electrical machine among a driving state, a power generation state, and a transistor-operated chopping power generation state.

5. The control apparatus for an internal combustion engine as set forth in claim 1, wherein
    said rotational fluctuation suppression section switches the operating state of said rotating electrical machine among a driving state, a power generation state, and a switching control state between said driving state and said power generation state, and a three-phase short circuited state in accordance with the electric power load of said vehicle and the amount of electric power of said power supply system; and
    said rotational fluctuation suppression section switches said power generation state among a diode-operated rectification power generation state, a transistor-operated chopping power generation state, and a switching control state of switching between said rectification power generation state and said chopping power generation state in accordance with the rotational speed of said internal combustion engine.

6. The control apparatus for an internal combustion engine as set forth in claim 1, wherein
    a stop time estimation section that calculates an estimated stop time of said vehicle; and
    a state selection section that selects a state of said internal combustion engine during a stop time of said vehicle;
    wherein said state selection section selects, based on at least one of said estimated stop time and the amount of electric power C of said power supply system, either of an idle state using said internal combustion engine alone, an idle assist state using said rotating electrical machine and said internal combustion engine in combination with each other, and a stop and restart state of said internal combustion engine.

7. The control apparatus for an internal combustion engine as set forth in claim 6, wherein
    said state selection section selects, as a control mode of said internal combustion engine, a state in which the best fuel mileage is obtained, by referring to a control map of said internal combustion engine with respect to said estimated stop time.

8. The control apparatus for an internal combustion engine as set forth in claim 6, wherein
    said state selection section compares said estimated stop time with a first reference time and a second reference time which is longer than said first reference time; and
    said state selection section selects, as a control mode of said internal combustion engine, said idle state when said estimated stop time is less than or equal to said first reference time, said idle assist state when said estimated stop time is longer than said first reference time and less than or equal to said second reference time, and said stop and restart state when said estimated stop time is longer than said second reference time.

* * * * *